July 15, 1924.

H. J. LINDEN

VEHICLE UNLOADING TRUCK

Filed Oct. 23, 1923

Inventor
Herbert J. Linden,
By Bernard F. Garvey
Attorney

July 15, 1924.

H. J. LINDEN

VEHICLE UNLOADING TRUCK

Filed Oct. 23, 1923

Inventor
Herbert J. Linden,

By Bernard F. Jarvey
Attorney

Patented July 15, 1924.

1,501,609

UNITED STATES PATENT OFFICE.

HERBERT J. LINDEN, OF JOHNSTOWN, PENNSYLVANIA.

VEHICLE-UNLOADING TRUCK.

Application filed October 23, 1923. Serial No. 670,281.

*To all whom it may concern:*

Be it known that I, HERBERT J. LINDEN, a citizen of the United States, residing at Johnstown, in the county of Cambria and State of Pennsylvania, have invented certain new and useful Improvements in Vehicle-Unloading Trucks, of which the following is a specification.

The present invention consists of a vehicle unloading truck especially adapted for unloading motor vehicles from freight cars.

An object of this invention is to provide a truck which may be transported with facility into the freight car and is of such construction that the chassis of the vehicle may be positioned thereon in a manner which permits expeditious mounting of the wheels to thereby make the vehicle self-sustaining in a minimum period of time without the aid of jacks, trestles or other supporting means now commonly used to augment trucks used for this purpose.

A further object of the invention is to provide a simple yet durable device of this character which primarily receives the vehicle chassis, in the position that the latter is stored in the freight car, subsequent to which the truck is capable of being urged into a horizontal plane to permit assemblage of the vehicle wheels on the chassis, the truck being ultimately collapsed to permit the vehicle wheels to engage the floor of the freight car or other supporting surface.

Other objects of the invention will be apparent from the following description of the present preferred form of the invention taken in connection with the accompanying drawings, wherein:—

It is of course well known in the art to provide wheeled trucks of various types including trucks of the type used in freight cars for unloading motor vehicles and consequently it is the purport of this invention to provide merely an improved type of truck of this character which is capable of unloading vehicles from a freight car without the aid of other structure or mechanism and with a minimum amount of manual labor and in a minimum period of time.

The device of this invention consists especially of a main supporting frame 7 which may be of rectangular or other desired configuration and is equipped with wheels or casters 8 through the medium of which the frame may be transported in an apparent manner. The front end of this frame is equipped with supporting straps 9 which are adapted for engagement with the front axle 10 of a vehicle being unloaded. The straps 9 are of angular design so as to embrace and retain the axle from displacement when the chassis is in an inclined position, as shown in Fig. 1, as well as when in a substantially horizontal position as shown in Fig. 2.

Figure 2:
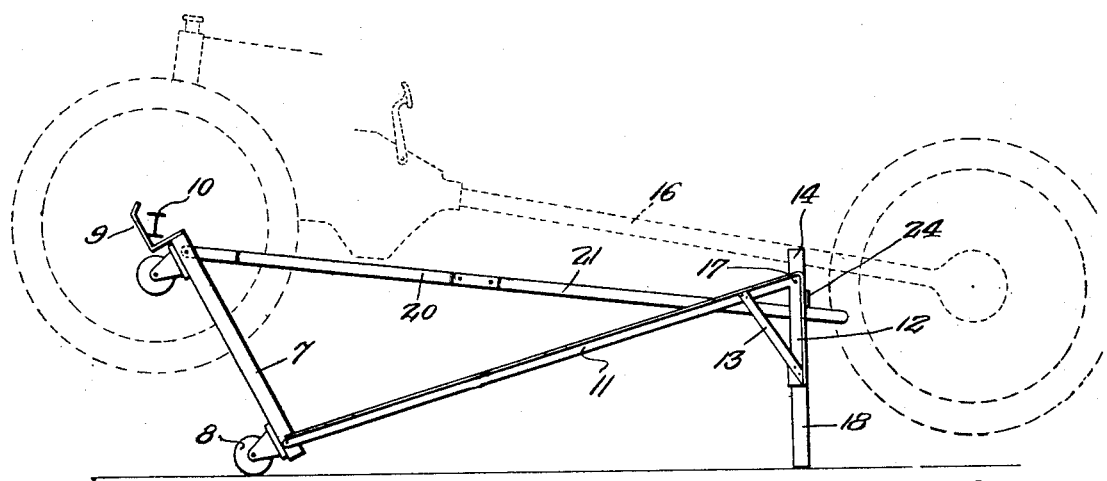
Fig. 2 is a similar view showing the truck frame moved into a substantially horizontal plane.
Figure 3:
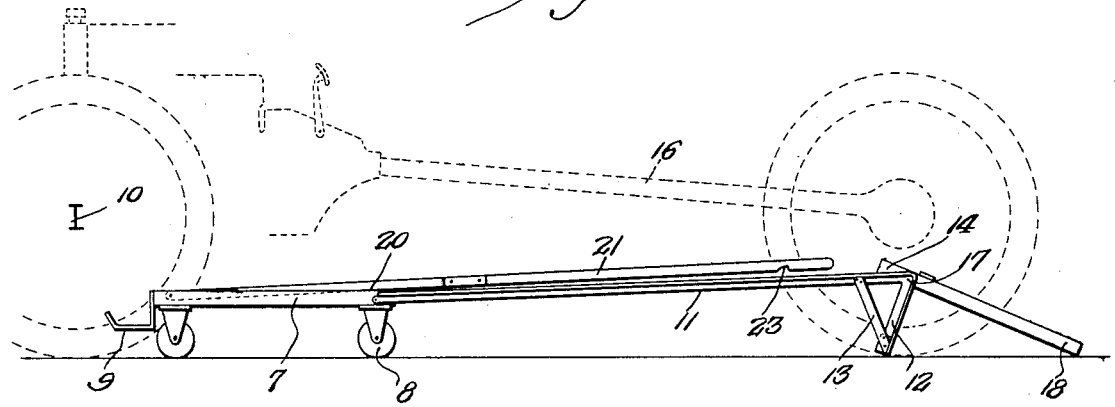
Fig. 3 is a similar view showing the truck frame collapsed.
Figures 4, 5, 6:
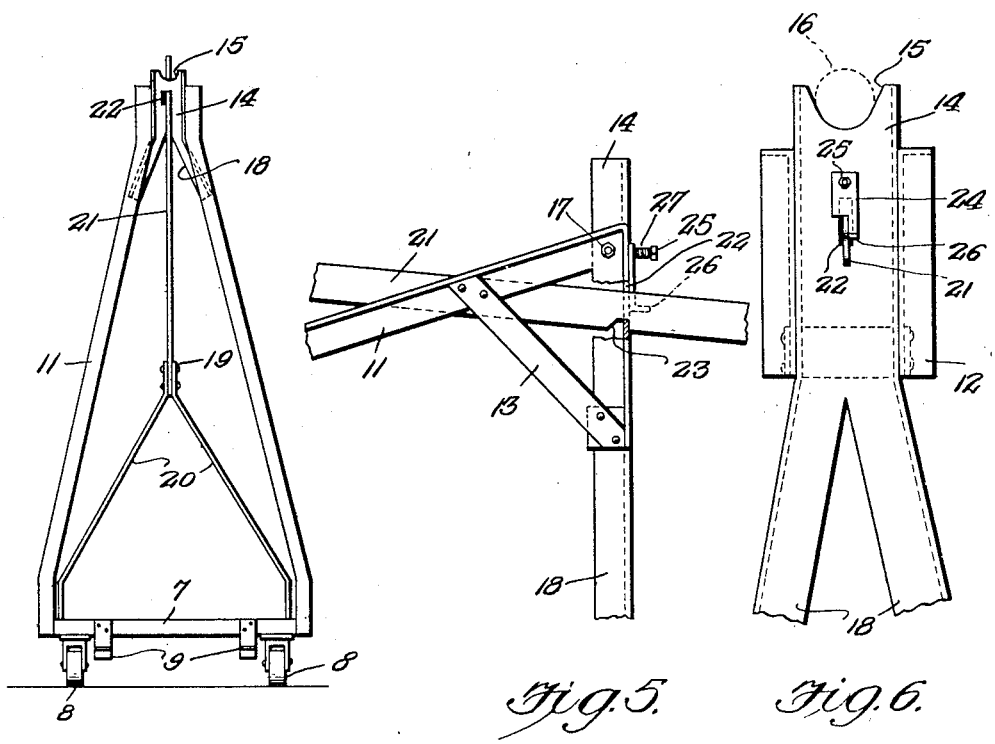
Fig. 4 is a front elevational view of the truck showing the superstructure disposed at an inclination such as illustrated in Fig. 1.
Fig. 5 is a detail enlarged fragmentary side elevational view of the truck illustrating the locking means used for holding the truck in a set-up position.
Fig. 6 is a rear elevational view of the same.

The frame 7 carries a pivoted superstructure 11 consisting of metal side bars the inner ends of which are pivotally engaged with the sides of the frame 7 while the outer ends are bent inwardly at an obtuse angle to provide legs 12. If desired, the legs 12 may be braced as indicated at 13 in order to provide a more rigid structure and positively prevent flexing of said legs against the side bars 12 when pressure is applied to said legs. Upon reference to Fig. 4 of the drawings it will be noted that the rear ends of the side bars 11 converge and embrace a supporting post 14 the free terminal of which is provided with a recess 15 in which the transmission tube 16 of the vehicle chassis is adapted to lie. The post 14 is pivoted at the jointure of the side bars 11 and legs 12, as indicated at 17, to permit the lower end of the post to swing outwardly when the truck is collapsed as indicated to advantage in Fig. 3. The lower end of the post is bifurcated and the branches thereof diverged to provide supporting legs 18 the lower ends of which are engageable with the bottom of the freight car or other supporting surface when the truck is disposed in a horizontal plane as shown in Fig. 2.

Figure 1:
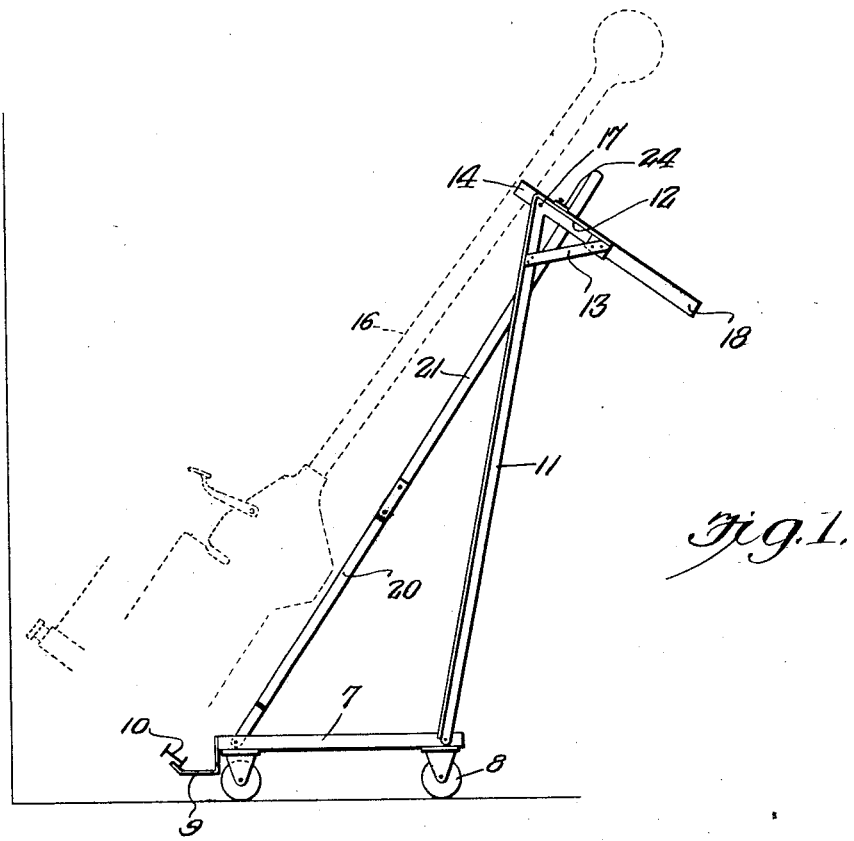
Fig. 1 is a side elevational view of a vehicle unloading truck constructed in accordance with this invention illustrating the position of the latter when the vehicle chassis is first mounted thereon.

In order to maintain the superstructure of the frame 7 in the inclined position shown in Fig. 1, suitable retaining mechanism is provided generally designated 19. This mechanism consists of a pair of straps 20 the outer ends of which are pivotally engaged with the frame 7 while the inner ends are secured to a bar 21 which latter is engageable through an opening 22 formed in the post 14 and is provided with a recess in its lower margin which is adapted to engage the lower wall of the opening 22. The bar 21 is held from casual displacement by a latch 24 the latter being pivotally mounted upon a bolt 25 which is carried by the post 14. The latch has its lower end bent outwardly to provide a finger piece 26 to permit the latch to be conveniently operated. The latch is normally held in engagement with the bar 21 in view of a spring 27 which is convoluted on the post 25.

In use of this device the superstructure of the truck is primarily placed in the position shown in Fig. 1 after which the front axle of the vehicle is engaged with the supporting straps 9. The transmission tube of the chassis is mounted in the recess 15 and since the chassis is disposed at an inclination and completely supported by the truck, there is no possibility of its being displaced. In order to permit the wheels to be conveniently engaged with the chassis the upper end of the superstructure of the truck is urged downwardly in the arc of a circle until the lower ends of the legs 18 engage the bottom of the freight car or other supporting surface. When in this position the truck is supported by said legs 18 and the rear pair of casters 8 of the frame 7. When the truck is in this position the vehicle chassis is held an appreciable distance above the bottom of the freight car to permit the wheels to be mounted thereon. After the wheels have been mounted the latch 24 is released and the bar 21 elevated to a point where the lower marginal edge of said bar clears the lower wall of the opening 22. This permits the superstructure of the truck to gravitate downwardly until the free terminals of the legs 12 engage the supporting surface. In this position the bar 21 is superimposed on the rear end of the frame 7 and the post 14 moves on its axis into the position shown in Fig. 3. The vehicle is then self-sustaining and may be moved in an apparent manner.

It is of course to be understood that various changes may be made in this device in order to adapt the same for use with different types of motor vehicles or for use in loading or unloading other commodities. However, the device is especially adapted for use in the unloading of vehicles in the manner above described and for this reason the form of invention herein recited has been preferred. Various changes may be made especially in the details of construction, proportion and arrangement of parts within the scope of the claims hereto appended.

What is claimed is:—

1. A truck for unloading vehicles from freight cars including a wheeled truck frame equipped with a vehicle chassis engaging superstructure, said superstructure being movable into a substantially horizontal plane, to suspend the chassis in a corresponding position, and being collapsible to permit contact of the vehicle wheels with the supporting surface.

2. A truck for unloading vehicles from freight cars including a frame, a portion of which extends upwardly at an inclination to receive the chassis of the vehicle, means carried by the upwardly extending portion of said frame to support said portion in a horizontal plane, said frame being collapsible to permit removal of the vehicle therefrom.

3. A truck for unloading vehicles from freight cars including a wheeled frame equipped with supporting straps for engagement with an axle of the vehicle, a superstructure pivotally mounted on said frame and selectively adjustable during assemblage of the vehicle, said superstructure being collapsible, after the vehicle has been assembled, to permit the vehicle to be operated under its own power.

4. A truck for unloading vehicles from freight cars including a wheeled frame equipped with supporting straps engageable beneath an axle of the vehicle, a superstructure carried by said frame and pivoted thereon, said frame being adjustable during assemblage of the vehicle parts, means to retain said superstructure in a set-up position for holding the vehicle in an elevated position, said means being releasable to permit the superstructure to collapse for engaging the vehicle with the supporting base which carries the truck.

In testimony whereof I affix my name.

HERBERT J. LINDEN.